(12) United States Patent
Epstein et al.

(10) Patent No.: US 7,478,913 B2
(45) Date of Patent: Jan. 20, 2009

(54) BACK-LIT DISPLAYS WITH HIGH ILLUMINATION UNIFORMITY

(75) Inventors: Kenneth A. Epstein, St. Paul, MN (US);
Kenneth J. Hanley, Eagan, MN (US);
James A. Stevenson, St. Paul, MN (US);
Robert M. Emmons, St. Paul, MN (US)

(73) Assignee: 3M Innovative Properties, St. Paul, MN (US)

( * ) Notice: Subject to any disclaimer, the term of this patent is extended or adjusted under 35 U.S.C. 154(b) by 236 days.

(21) Appl. No.: 11/560,250

(22) Filed: Nov. 15, 2006

(65) Prior Publication Data

US 2008/0111945 A1 May 15, 2008

(51) Int. Cl.
*G01D 11/28* (2006.01)
(52) U.S. Cl. .................. 362/30; 362/97; 362/244; 362/246; 362/330; 362/339; 349/62
(58) Field of Classification Search .................. 362/29, 362/30, 97, 240, 244, 246, 330, 339; 349/62
See application file for complete search history.

(56) References Cited

U.S. PATENT DOCUMENTS

| | | | |
|---|---|---|---|
| 3,566,102 A | 2/1971 | Choyke, Jr. |
| 3,721,818 A | 3/1973 | Stahlhut |
| 4,173,399 A | 11/1979 | Yevick |
| 4,268,118 A | 5/1981 | Palmquist et al. |
| 4,497,860 A | 2/1985 | Brady, Jr. |
| 4,708,435 A | 11/1987 | Yata et al. |
| 4,791,540 A | 12/1988 | Dreyer, Jr. et al. |
| 4,883,341 A | 11/1989 | Whitehead |
| 5,161,041 A | 11/1992 | Abileah et al. |
| 5,659,410 A | 8/1997 | Koike et al. |
| 5,751,388 A | 5/1998 | Larson |

(Continued)

FOREIGN PATENT DOCUMENTS

CN 1690841 11/2005

(Continued)

OTHER PUBLICATIONS

"3M™ Image Directing Film (IDF) II—Sending light off in the right direction," 1996.

(Continued)

*Primary Examiner*—Stephen F Husar
(74) *Attorney, Agent, or Firm*—Jay R Pralte

(57) ABSTRACT

A directly illuminated display unit has a display panel and one or more light sources disposed behind the display panel. A diffuser is disposed between the light source unit and the display panel and a light diverting layer is disposed between the one or more light sources and the diffuser. The light diverting layer has light diverting members on a first side of the light diverting layer facing the diffuser. Surfaces of the light diverting members are disposed at more than one angle relative to a normal to the light diverting layer and also include one or more sharp changes of surface slope. The light diverting members spread the illumination light so as to be more uniform. Different light diverting members can have different apex angles. Also, different sides of a light diverting member can have best fit centers of curvature that are non-coincident.

24 Claims, 12 Drawing Sheets

U.S. PATENT DOCUMENTS

| | | |
|---|---|---|
| 5,793,456 A | 8/1998 | Broer et al. |
| 5,825,543 A | 10/1998 | Ouderkirk et al. |
| 5,867,316 A | 2/1999 | Carlson et al. |
| 5,882,774 A | 3/1999 | Jonza et al. |
| 5,887,964 A | 3/1999 | Higuchi et al. |
| 5,914,759 A | 6/1999 | Higuchi et al. |
| 6,031,664 A | 2/2000 | Goto |
| 6,055,108 A | 4/2000 | Dreyer |
| 6,122,103 A | 9/2000 | Perkins et al. |
| 6,151,169 A | 11/2000 | Kim |
| RE37,377 E | 9/2001 | Gunjima et al. |
| 6,356,389 B1 | 3/2002 | Nilsen et al. |
| 6,595,652 B2 | 7/2003 | Oda et al. |
| 6,617,784 B1 | 9/2003 | Abe et al. |
| 6,666,569 B2 | 12/2003 | Obata |
| 6,799,859 B1 | 10/2004 | Ida et al. |
| 6,827,458 B2 | 12/2004 | Suga |
| 6,981,776 B2 | 12/2004 | Lee |
| 6,846,089 B2 | 1/2005 | Stevenson et al. |
| 6,997,595 B2 | 2/2006 | Mi et al. |
| 7,072,109 B2 | 4/2006 | Goto et al. |
| 7,063,448 B2 | 6/2006 | Kang et al. |
| 7,125,154 B2 | 10/2006 | Blanc |
| 7,220,036 B2 | 5/2007 | Yi et al. |
| 7,303,323 B2 * | 12/2007 | Choi et al. ................. 362/339 |
| 7,309,153 B2 * | 12/2007 | Arihara ....................... 349/62 |
| 2002/0159019 A1 | 10/2002 | Pokorny et al. |
| 2003/0118805 A1 | 6/2003 | Kretman et al. |
| 2004/0085749 A1 | 5/2004 | Parker et al. |
| 2004/0246697 A1 | 12/2004 | Yamashita et al. |
| 2005/0052750 A1 | 3/2005 | King et al. |
| 2005/0146872 A1 | 7/2005 | Chang et al. |
| 2005/0270654 A1 | 12/2005 | Goto et al. |
| 2005/0280752 A1 | 12/2005 | Kim et al. |
| 2006/0033859 A1 | 2/2006 | Yun |
| 2006/0082698 A1 | 4/2006 | Ko et al. |
| 2006/0082700 A1 | 4/2006 | Gehlsen et al. |
| 2006/0098434 A1 * | 5/2006 | Liu et al. .................... 362/246 |
| 2006/0250544 A1 | 11/2006 | Ohkawa |
| 2006/0262555 A1 | 11/2006 | Yi et al. |
| 2007/0030415 A1 | 2/2007 | Epstein |
| 2007/0047254 A1 | 3/2007 | Schardt et al. |

FOREIGN PATENT DOCUMENTS

| | | |
|---|---|---|
| JP | 08-262206 | 10/1996 |
| JP | 09-101521 A | 4/1997 |
| JP | 11-147255 | 6/1999 |
| JP | 2000-056107 | 2/2000 |
| JP | 2001-202814 | 7/2001 |
| JP | 2002-133930 | 5/2002 |
| JP | 2002-352611 | 12/2002 |
| KR | 10-1999-0078225 | 10/1999 |
| KR | 10-2003-0097143 | 12/2003 |
| KR | 10-2004-0019752 | 3/2004 |
| WO | WO 2004/053538 | 6/2004 |
| WO | WO 2006/004492 | 1/2006 |
| WO | WO 2006/026743 | 3/2006 |

OTHER PUBLICATIONS

"3M™ Diffusing Film Alternative (DFA)—Maximum uniformity and efficiency in flat panel displays," 1996.

"3M™ Brightness Enhancement Film (BEF) I—The original bright idea," 1996.

"3M™ Transmissive Right Angle Film (TRAF) II—All the right angles to do two jobs," 1996.

"DNP Optical Sheets" dated Feb. 14, 2006, Display Components Development Department, R&D Division, Display Components Operations, Dai Nippon Printing Co., Ltd. © 2006 Dai Nippon Printing Co., Ltd.

U.S. Appl. No. 11/467,326, titled "Backlight Suitable for Display Devices," filed Aug. 25, 2006.

U.S. Appl. No. 11/560,234, titled "Back-lit Displays with High Illumination Uniformity," filed Nov. 15, 2006.

U.S. Appl. No. 11/560,271, titled "Back-lit Displays with High Illumination Uniformity", filed Nov. 15, 2006.

U.S. Appl. No. 60/865,944, titled "Back-lit Displays with High Illumination Uniformity", filed Nov. 15, 2006.

U.S. Appl. No. 11/560,260, titled "Back-lit Displays with High Illumination Uniformity", filed Nov. 15, 2006.

\* cited by examiner

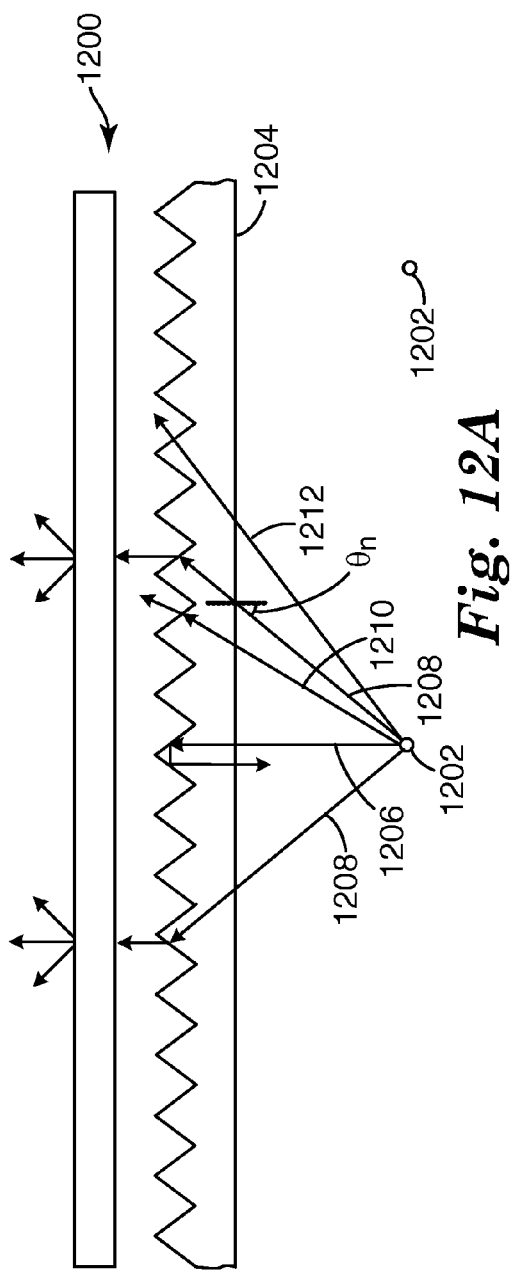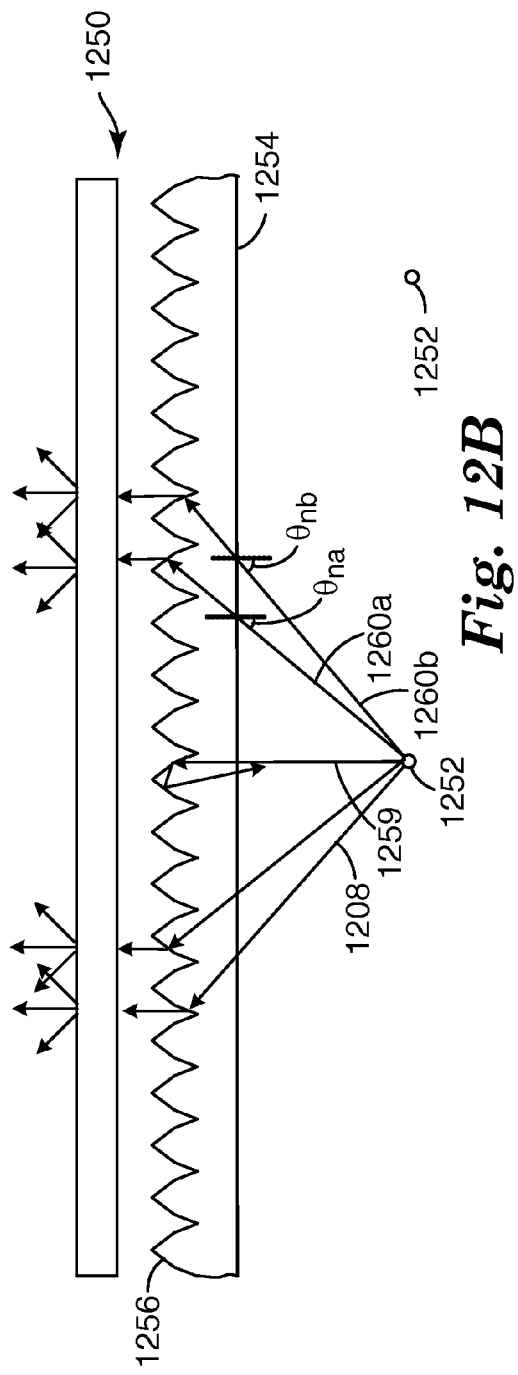

BACK-LIT DISPLAYS WITH HIGH ILLUMINATION UNIFORMITY

RELATED APPLICATIONS

This application is related to the following U.S. Patent Applications, filed on even day herewith and which are incorporated by reference: "Back-Lit Displays with High Illumination Uniformity", U.S. patent application Ser. No. 11/560,260; "Back-Lit Displays with High Illumination Uniformity", U.S. patent application Ser. No. 11/560,271; "Back-Lit Displays with High Illumination Uniformity", U.S. patent application Ser. No. 60/865,944; and "Back-Lit Displays with High Illumination Uniformity", U.S. patent application Ser. No. 11/560,234.

FIELD OF THE INVENTION

The invention relates to optical displays, and more particularly to liquid crystal displays (LCDs) that are directly illuminated by light sources from behind, such as may be used in LCD monitors and LCD televisions.

BACKGROUND

Some display systems, for example liquid crystal displays (LCDs), are illuminated from behind. Such displays find widespread application in many devices such as laptop computers, hand-held calculators, digital watches, televisions and the like. Some backlit displays include a light source that is located to the side of the display, with a light guide positioned to guide the light from the light source to the back of the display panel. Other backlit displays, for example some LCD monitors and LCD televisions (LCD-TVs), are directly illuminated from behind using a number of light sources positioned behind the display panel. This latter arrangement is increasingly common with larger displays because the light power requirements, needed to achieve a certain level of display brightness, increase with the square of the display size, whereas the available real estate for locating light sources along the side of the display only increases linearly with display size. In addition, some display applications, such as LCD-TVs, require that the display be bright enough to be viewed from a greater distance than other applications. In addition, the viewing angle requirements for LCD-TVs are generally different from those for LCD monitors and hand-held devices.

Many LCD monitors and LCD-TVs are illuminated from behind by a number of cold cathode fluorescent lamps (CCFLs). These light sources are linear and stretch across the full width of the display, with the result that the back of the display is illuminated by a series of bright stripes separated by darker regions. Such an illumination profile is not desirable, and so a diffuser plate is typically used to smooth the illumination profile at the back of the LCD device.

A diffuse reflector is used behind the lamps to direct light towards the viewer, with the lamps being positioned between the reflector and the diffuser. The separation between the diffuse reflector and the diffuser is limited by the desired brightness uniformity of the light emitted from the diffuser. If the separation is too small, then the luminance becomes less uniform, thus spoiling the image viewed by the viewer. This comes about because there is insufficient space for the light to spread uniformly between the lamps.

SUMMARY OF THE INVENTION

An embodiment of the invention is directed to a directly illuminated display unit that has a display panel and one or more light sources disposed behind the display panel and that are capable of producing illumination light. A diffuser is disposed between the one or more light sources and the display panel. A light diverting layer is disposed between the one or more light sources and the diffuser. The light diverting layer comprises light diverting members disposed on a first face of the light diverting layer facing the diffuser. At least one of the light diverting members has a surface with at least one sharp change in slope and has a first side and a second side, the first and second sides of the at least one of the light diverting members each comprising at least one of a plurality of facets and a curved surface, the first side having a first best fit center of curvature and the second side having a second best fit center of curvature, the positions of the first and second best fit centers of curvature being different.

The above summary of the present invention is not intended to describe each illustrated embodiment or every implementation of the present invention. The figures and the following detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 3A, 3B, 4A-4D, 5, and 6A-6E schematically illustrate additional embodiments of EUF according to principles of the present invention;

FIGS. 12A and 12B schematically illustrate different illumination systems used for describing an EUF according to the present invention.

Figure 1:
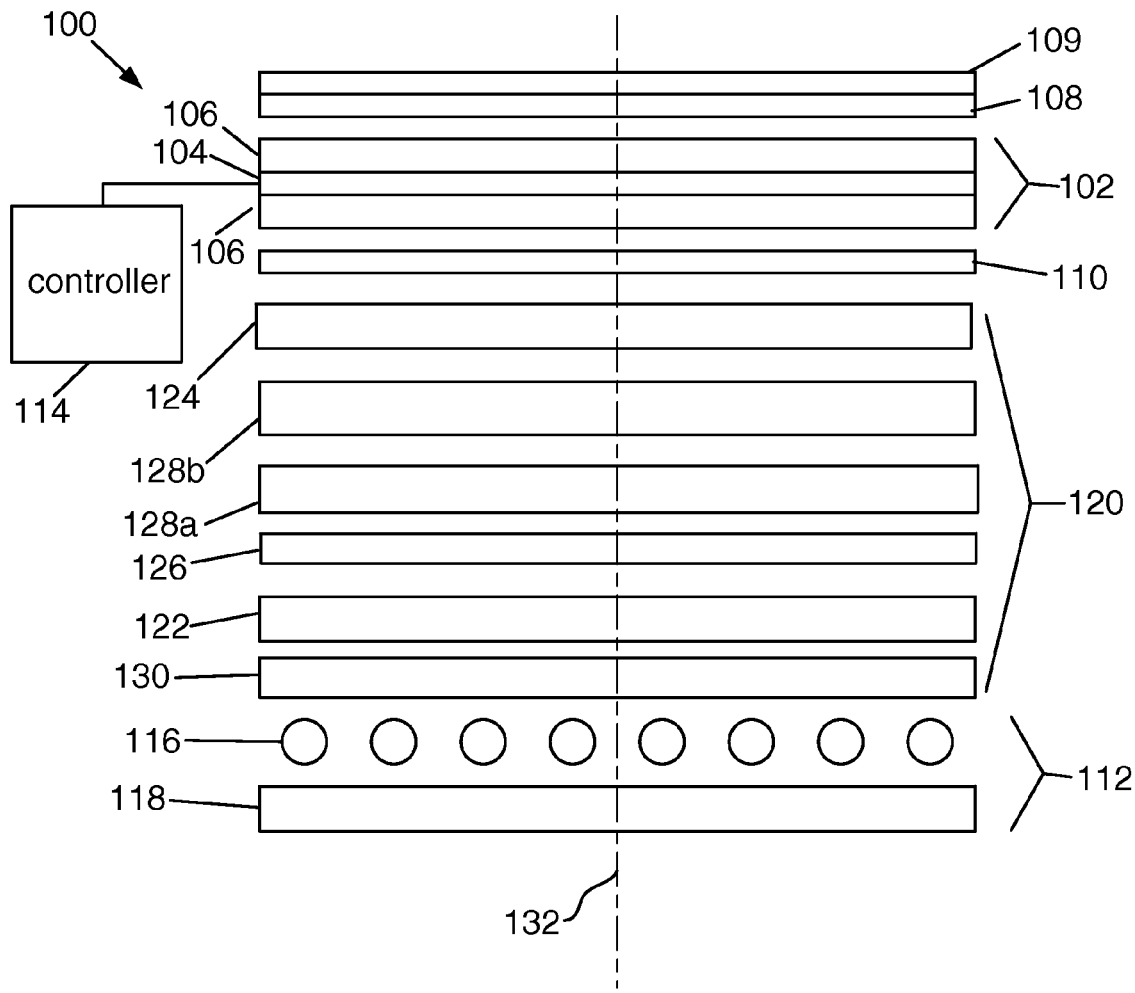
FIG. 1 schematically illustrates a back-lit liquid crystal display device that uses a brightness uniformizing layer according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to display panels, such as liquid crystal displays (LCDs, or LC displays), and is particularly applicable to LCDs that are directly illuminated from behind, for example as are used in LCD monitors and LCD televisions (LCD-TVs). More specifically, the invention is directed to the management of light generated by a direct-lit backlight for illuminating an LC display. An arrangement of light management films is typically positioned between the backlight and the display panel itself. The arrangement of light management films, which may be laminated together or may be free standing, typically includes a diffuser layer and at least one brightness enhancement film having a prismatically structured surface.

A schematic exploded view of an exemplary embodiment of a direct-lit display device 100 is presented in FIG. 1. Such a display device 100 may be used, for example, in an LCD monitor or LCD-TV. The display device 100 may be based on the use of an LC panel 102, which typically comprises a layer of LC 104 disposed between panel plates 106. The plates 106 are often formed of glass, and may include electrode structures and alignment layers on their inner surfaces for controlling the orientation of the liquid crystals in the LC layer 104. The electrode structures are commonly arranged so as to define LC panel pixels, areas of the LC layer where the orientation of the liquid crystals can be controlled independently of adjacent areas. A color filter may also be included with one or more of the plates 106 for imposing color on the image displayed.

An upper absorbing polarizer 108 is positioned above the LC layer 104 and a lower absorbing polarizer 110 is positioned below the LC layer 104. In the illustrated embodiment, the upper and lower absorbing polarizers are located outside the LC panel 102. The absorbing polarizers 108, 110 and the LC panel 102 in combination control the transmission of light from the backlight 112 through the display 100 to the viewer. For example, the absorbing polarizers 108, 110 may be arranged with their transmission axes perpendicular. In an unactivated state, a pixel of the LC layer 104 may not change the polarization of light passing therethrough. Accordingly, light that passes through the lower absorbing polarizer 110 is absorbed by the upper absorbing polarizer 108. When the pixel is activated, on the other, hand, the polarization of the light passing therethrough is rotated, so that at least some of the light that is transmitted through the lower absorbing polarizer 110 is also transmitted through the upper absorbing polarizer 108. Selective activation of the different pixels of the LC layer 104, for example by a controller 114, results in the light passing out of the display at certain desired locations, thus forming an image seen by the viewer. The controller may include, for example, a computer or a television controller that receives and displays television images. One or more optional layers 109 may be provided over the upper absorbing polarizer 108, for example to provide mechanical and/or environmental protection to the display surface. In one exemplary embodiment, the layer 109 may include a hardcoat over the absorbing polarizer 108.

It will be appreciated that some type of LC displays may operate in a manner different from that described above. For example, the absorbing polarizers may be aligned parallel and the LC panel may rotate the polarization of the light when in an unactivated state. Regardless, the basic structure of such displays remains similar to that described above.

The backlight 112 includes a number of light sources 116 that generate the light that illuminates the LC panel 102. The light sources 116 used in a LCD-TV or LCD monitor are often linear, cold cathode, fluorescent tubes that extend along the height of the display device 100. Other types of light sources may be used, however, such as filament or arc lamps, light emitting diodes (LEDs), flat fluorescent panels or external fluorescent lamps. This list of light sources is not intended to be limiting or exhaustive, but only exemplary.

The backlight 112 may also include a reflector 118 for reflecting light propagating downwards from the light sources 116, in a direction away from the LC panel 102. The reflector 118 may also be useful for recycling light within the display device 100, as is explained below. The reflector 118 may be a specular reflector or may be a diffuse reflector. One example of a specular reflector that may be used as the reflector 118 is Vikuiti™ Enhanced Specular Reflection (ESR) film available from 3M Company, St. Paul, Minn. Examples of suitable diffuse reflectors include polymers, such as PET, PC, PP, PS loaded with diffusely reflective particles, such as titanium dioxide, barium sulphate, calcium carbonate or the like. Other examples of diffuse reflectors, including microporous materials and fibril-containing materials, are discussed in co-owned U.S. Patent Application Publication 2003/0118805 A1, incorporated herein by reference.

An arrangement 120 of light management films, which may also be referred to as a light management unit, is positioned between the backlight 112 and the LC panel 102. The light management films affect the light propagating from backlight 112 so as to improve the operation of the display device 100. For example, the arrangement 120 of light management films may include a diffuser plate 122. The diffuser plate 122 is used to diffuse the light received from the light sources, which results in an increase in the uniformity of the illumination light incident on the LC panel 102. Consequently, this results in an image perceived by the viewer that is more uniformly bright. In some embodiments the diffuser plate 122 may be formed as a layer that contains bulk diffusing particles. In some embodiments, the diffuser plate may be attached to another layer in the arrangement of light management films 120 or may be omitted.

The light management unit 120 may also include a reflective polarizer 124. The light sources 116 typically produce unpolarized light but the lower absorbing polarizer 110 only transmits a single polarization state, and so about half of the light generated by the light sources 116 is not transmitted through to the LC layer 104. The reflecting polarizer 124, however, may be used to reflect the light that would otherwise be absorbed in the lower absorbing polarizer, and so this light may be recycled by reflection between the reflecting polarizer 124 and the reflector 118. At least some of the light reflected by the reflecting polarizer 124 may be depolarized, and subsequently returned to the reflecting polarizer 124 in a polarization state that is transmitted through the reflecting polarizer 124 and the lower absorbing polarizer 110 to the LC layer 104. In this manner, the reflecting polarizer 124 may be used to increase the fraction of light emitted by the light sources 116 that reaches the LC layer 104, and so the image produced by the display device 100 is brighter.

Any suitable type of reflective polarizer may be used, for example, multilayer optical film (MOF) reflective polarizers; diffusely reflective polarizing film (DRPF), such as continuous/disperse phase polarizers, wire grid reflective polarizers or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774, incorporated herein by reference. Commercially available examples of MOF reflective polarizers include Vikuiti™ DBEF-D200 and DBEF-D440 multilayer reflective polarizers that include diffusive surfaces, available from 3M Company, St. Paul, Minn.

Examples of DRPF useful in connection with the present invention include continuous/disperse phase reflective polarizers as described in co-owned U.S. Pat. No. 5,825,543, incorporated herein by reference, and diffusely reflecting multilayer polarizers as described in e.g. co-owned U.S. Pat. No. 5,867,316, also incorporated herein by reference. Other suitable types of DRPF are described in U.S. Pat. No. 5,751,388.

Some examples of wire grid polarizers useful in connection with the present invention include those described in U.S. Pat. No. 6,122,103. Wire grid polarizers are commercially available from, inter alia, Moxtek Inc., Orem, Utah.

Some examples of cholesteric polarizer useful in connection with the present invention include those described in, for example, U.S. Pat. No. 5,793,456, and U.S. Patent Publication No. 2002/0159019. Cholesteric polarizers are often provided along with a quarter wave retarding layer on the output side, so that the light transmitted through the cholesteric polarizer is converted to linear polarization.

In some embodiments, the reflective polarizer 126 may provide diffusion, for example with a diffusing surface facing the backlight 112. In other embodiments, the reflective polarizer 126 may be provided with a brightness enhancing surface that increases the gain of the light that passes through the reflective polarizer 126. For example, the upper surface of the reflective polarizer 126 may be provided with a prismatic brightness enhancing surface or with a gain diffusing surface. Brightness enhancing surfaces are discussed in greater detail below. In other embodiments, the reflective polarizer may be provided with a diffusing feature, such as a diffusing surface or volume, on the side facing the backlight 112 and with a brightness enhancing feature, such as a prismatic surface or gain diffusing surface, on the side facing the LC panel 102.

A polarization control layer 126 may be provided in some exemplary embodiments, for example between the diffuser plate 122 and the reflective polarizer 124. Examples of polarization control layer 126 include a quarter wave retarding layer and a polarization rotating layer, such as a liquid crystal polarization rotating layer. A polarization control layer 126 may be used to change the polarization of light that is reflected from the reflective polarizer 124 so that an increased fraction of the recycled light is transmitted through the reflective polarizer 124.

The arrangement 120 of light management layers may also include one or more brightness enhancing layers. A brightness enhancing layer is one that includes a surface structure that redirects off-axis light in a direction closer to the axis 132 of the display. This increases the amount of light propagating on-axis through the LC layer 104, thus increasing the brightness of the image seen by the viewer. One example is a prismatic brightness enhancing layer, which has a number of prismatic ridges that redirect the illumination light, through refraction and reflection. Examples of prismatic brightness enhancing layers that may be used in the display device include the Vikuiti™ BEFII and BEFIII family of prismatic films available from 3M Company, St. Paul, Minn., including BEFII 90/24, BEFII 90/50, BEFIIIM 90/50, and BEFIIIT.

A prismatic brightness enhancing layer typically provides optical gain in one dimension. A second brightness enhancing layer 128*b* may also be included in the arrangement 120 of light management layers, in which a prismatic brightness enhancing layer is arranged with its prismatic structure oriented orthogonally to the prismatic structure of the first brightness enhancing layer 128*a*. Such a configuration provides an increase in the optical gain of the display unit in two dimensions. In the illustrated embodiment, the brightness enhancing layers 128*a*, 128*b* are be positioned between the backlight 112 and the reflective polarizer 124. In other embodiments, the brightness enhancing layers 128*a* and 128*b* may be disposed between the reflective polarizer 124 and the LC panel 102.

Another type of brightness enhancing layer 128*a* that may be used to increase the on-axis brightness of the light passing through the display is a gain diffusing layer. One example of a gain diffuser layer is a layer that is provided with an arrangement of elements that act as lenses on its upper surface. At least some of the light that passes out of the gain diffuser layer 128*a* that would otherwise propagate at a relative large angle to the axis 132 of the display is redirected by the elements on the layer surface to propagate in a direction more parallel to the axis 132. More than one gain diffusing brightness enhancing layers 128*a* may be used. For example two or three gain diffusing layers 128*a*, 128*b* may be used. In addition, one or more gain diffusing layers 128*a* may be used along with one or more prismatic brightness enhancing films 128*b*. In such a case, the gain diffusing films 128*a* and prismatic brightness enhancing layers 128*b* may be placed in any desired order within the arrangement of light management films 120. One example of a gain diffuser layer that may be used in a display is a type BS-42 film available from Keiwa Inc., Osaka, Japan.

The different layers in the light management unit may be free standing. In other embodiments, two or more of the layers in the light management unit may be laminated together, for example as discussed in co-owned U.S. patent application Ser. No. 10/966,610, incorporated herein by reference. In other exemplary embodiments, the light management unit may include two subassemblies separated by a gap, for example as described in co-owned U.S. patent application Ser. No. 10/965,937, incorporated herein by reference.

Conventionally, the spacing between the light sources 116 and the diffuser layer 122, the spacing between adjacent light sources 116 and the diffuser transmission are significant factors considered in designing the display for a given value of brightness and uniformity of illumination. Generally, a strong diffuser, i.e. a diffuser that diffuses a higher fraction of the incident light, will improve the uniformity but will also result in reduced brightness, because the high diffusing level is accompanied by strong back diffusion and a concomitant increase in losses.

Under normal diffusion conditions, the variations in brightness seen across a screen are characterized by brightness maxima located above the light sources, and brightness minima located between the light sources. An enhanced uniformity film (EUF) 130 may be positioned between the light sources 130 and the diffuser layer 122 to reduce the nonuniformity in the illumination of the display panel 102. Each face of the EUF 130, namely the side facing towards the light sources 116 and the side facing towards the display panel 102, may include a light-diverting surface. A light diverting surfaces is formed by a number of light diverting elements that refractively divert light passing from one side of the EUF 130 to another in a manner that reduces the illumination non-uniformity. The light diverting elements comprise a portion of the EUF surface that is non-parallel to the plane of the EUF 130. The light diverting elements may be provided as protrusions or recesses on the surface of the EUF 130.

Figure 2:
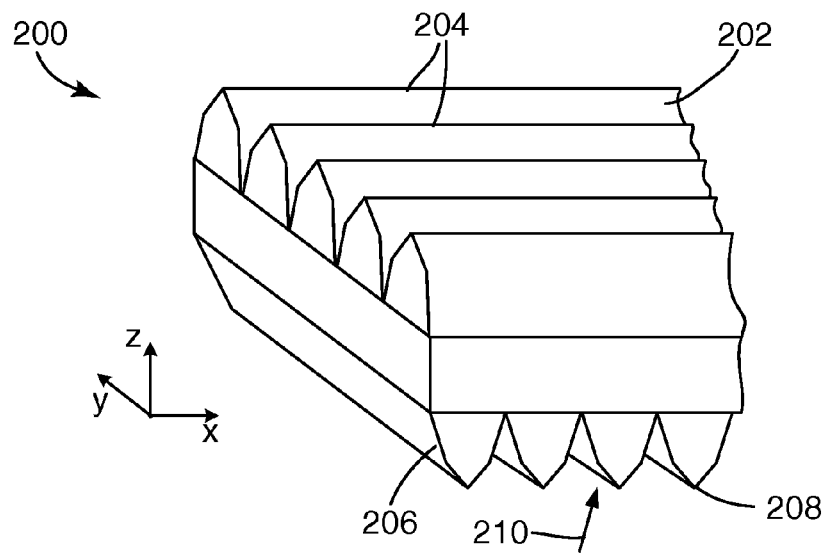
FIG. 2 schematically illustrates an embodiment of an enhanced uniformity film (EUF) according to principles of the present invention.

One particular exemplary embodiment of EUF 200 is schematically illustrated in FIG. 2. The EUF 200 comprises a first light diverting surface 202 that includes first light diverting elements 204. In this particular embodiment, the light diverting elements 204 are formed as faceted ribs that lie across the surface of the EUF 200. A second light diverting surface 206, on the other side of the EUF from the first light diverting surface 202, also includes light diverting elements 208. In the illustrated embodiment, the light diverting elements 208 are shaped as faceted ribs. In this configuration of EUF 200, the ribbed light diverting elements 204 and 208 are relatively oriented so that light 210 incident on the EUF 200 in a direction parallel to the z-axis from below is diverted in the x-z plane by the second light diverting surface 206. On exiting the EUF 200, light propagating within the EUF 200 parallel to the z-axis is diverted in the y-z plane by the first light diverting surface 202. Thus, since light normally incident on the film 200 is diverted in a plane parallel to the x-z plane, the elements 204 may be said to form a light diverting plane that is parallel to the x-z direction. As used herein, the term normal incidence refers to light that is perpendicularly incident. Likewise, since light propagating within the film parallel to the z-axis is diverted in the y-z plane, the elements 208 may be said to form a light diverting plane that is parallel to the y-z direction. In this configuration, the light diverting planes arising from the light diverting elements 204 and 208 are perpendicular to each other. In other configurations, the light diverting planes may be non-parallel without being perpendicular.

In some configurations, the light diverting elements of the upper or lower side may divert light in more than one direction. In such a case, the light diverting plane is taken to mean that plane which constitutes the direction where the diversion is greatest.

In some embodiments, the EUF may itself be formed of diffusive material, for example a polymer matrix containing bulk diffusing particles. The diffusing particles may extend throughout the EUF, or may be absent from parts of the EUF such as the light diverting elements. Where the EUF is diffusive, the arrangement of light management films need not include an additional diffuser layer between the EUF and the display panel, although an additional diffuser layer may be present.

Figure 3A:
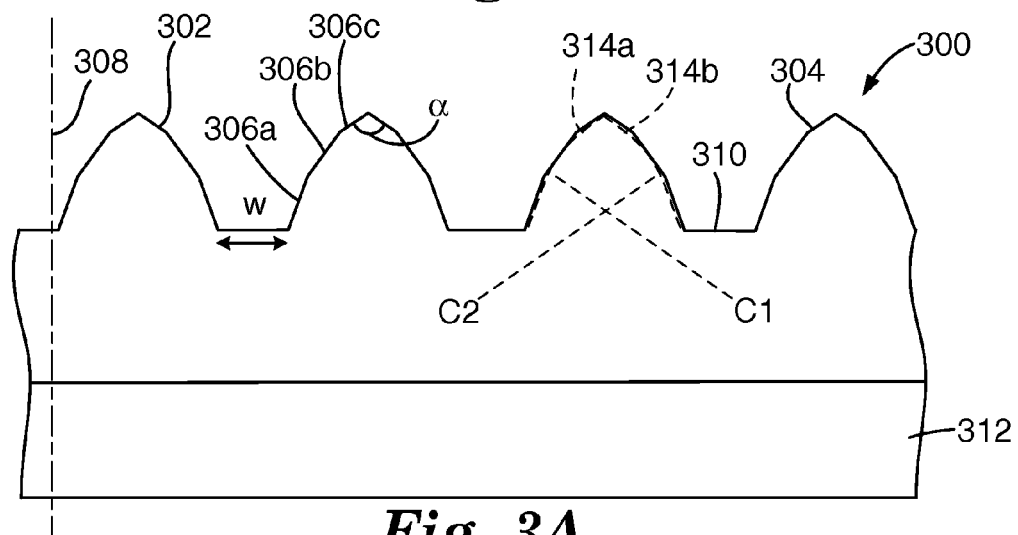
Figure 3B:
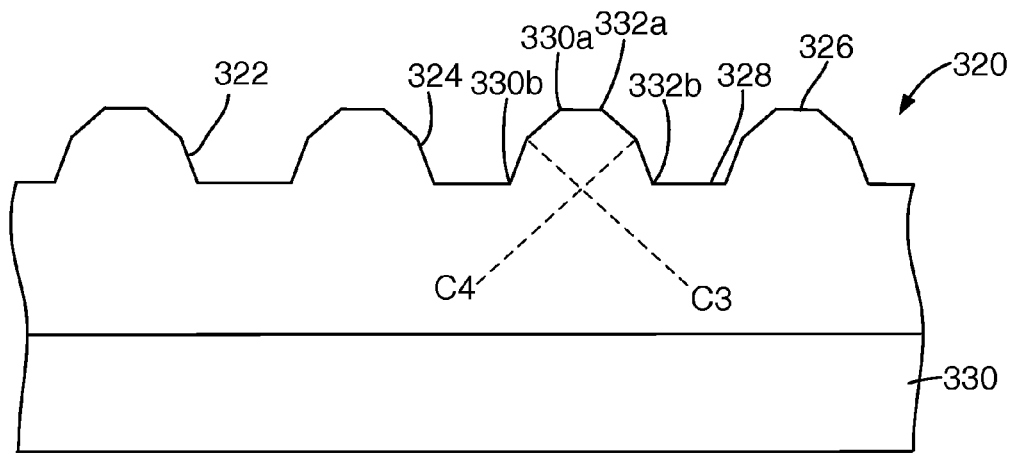

The light diverting surfaces on the EUF may include light diverting elements of different shapes and may also include various portions that lie parallel to the EUF. Some additional exemplary embodiments of EUF are schematically illustrated in FIGS. 3A and 3B. In FIG. 3A, the illustrated embodiment of EUF 300 has an upper light diverting surface 302 that includes light diverting elements 304 having a faceted cross-sectional shape, having an apex angle, α, and each side comprising three flat surfaces 306a, 306b and 306c oriented at different angles relative to the axis 308. In this particular embodiment, there is a flat region 310 between adjacent light diverting elements 304 where the film surface is parallel to the plane of the EUF 300. The width of the flat region 310 is shown as "w".

Each side of the light diverting element 304 may be approximated by a best fit curve 314a and 314b, having respective centers of curvature C1 and C2.

The lower surface 312 may be a second light diverting surface provided with light diverting elements of the same shape as those on the upper light diverting surface 302 or may have a different shape. In other embodiments, the lower surface 312 may be flat.

In FIG. 3B, the EUF 320 has a light diverting surface 322 that includes faceted light diverting elements 324 having a flat top portion 326. In this particular embodiment, there is also a flat region 328 between adjacent light diverting elements 324. The lower light diverting surface 330 may have the same shape as the first light diverting surface 322, or may have a different shape.

The faceted sides of the light diverting elements, between points 330a and 330b, and between points 332a and 332b, may be approximately by best-fit curves that have centers of curvature C3 and C4 respectively. It has been found that the performance of the EUF is increased where the centers of curvature of each side are not coincident. In the examples just described, this means that the performance is improved where the centers C1 and C2 are not coincident or the centers C3 and C4 are not coincident.

Figure 4A:
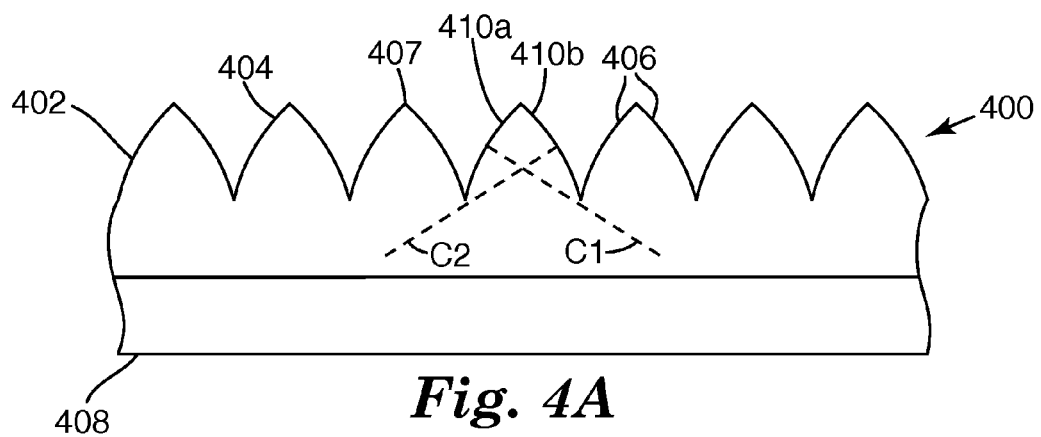

Some other exemplary embodiments of EUF are schematically illustrated in FIGS. 4A-4D. In FIG. 4A, the EUF 400 has a first light diverting surface 402 that includes light diverting elements 404 having curved faces 406 that meet at an apex 407. The second light diverting surface 408 may have light diverting elements having curved faces although this is not necessary. Likewise, in other embodiments, the first light diverting surface may not have one or more curved surfaces while the second light diverting surface does have one or more curved surfaces.

Figure 4B:
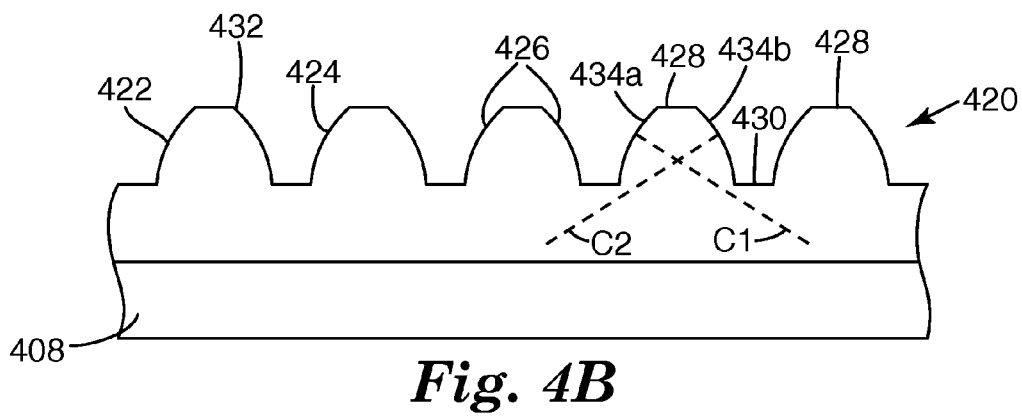

The exemplary embodiment of EUF 420, schematically illustrated in FIG. 4B, has a light diverting surface 422 with light diverting elements 424 that have curved surfaces 426 and flat portions 428. In the illustrated embodiment, the flat portions 428 are parallel to the plane of the EUF film 420. In some embodiments, the light diverting surface 422 may contain flat portions 430 between the light diverting elements 424. In the illustrated embodiment, the flat portions 430 are parallel to the plane of the EUF 420.

In the exemplary embodiments illustrated in FIGS. 4A and 4B, the curved surfaces of the light diverting elements 404, 424 include a relatively abrupt change in surface gradient that may be considered similar to a mathematical discontinuity. For example, an abrupt change in gradient occurs at point 408 in FIG. 4A, at the apex 407 of the light diverting member 404, and at point 432 of the light diverting member 424 in FIG. 4B. These relatively abrupt changes in gradient prevent a single light diverting member from operating as a lens, since a lens requires smooth changes in the gradient across its surface. Thus, the light diverting members 404, 424 do not produce a single focus for parallel light passing therethrough, either a real focus or a virtual focus. It will be appreciated that any of the light diverting surfaces discussed herein may be included on a single-sided EUF, in other words one that has a light diverting surface on only one side of the film, or a two-sided EUF, one that has light diverting surfaces on both sides.

Figure 4C:
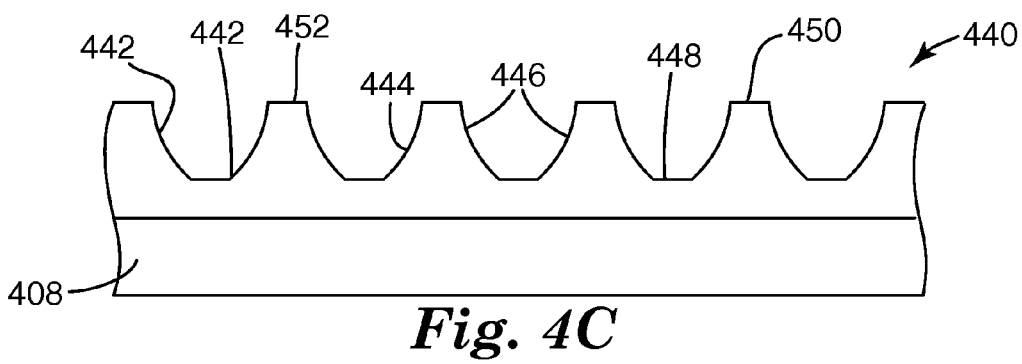

In the exemplary embodiments illustrated in FIGS. 4A and 4B, the light diverting elements 402, 422 may be viewed as protruding from the surface of the EUF 400, 420. In other embodiments, the light diverting elements may be formed as recesses in the surface of the EUF. One exemplary embodiment of such an EUF 440 is schematically illustrated in FIG. 4C. In this case, the light diverting surface 442 is formed with light diverting elements 444 having surfaces 446. In some embodiments, flat areas 448 may be provided in the depression, and flat areas 450 may be provided between light diverting elements 444. It is unimportant to the invention whether a light diverting surface contains light diverting elements that protrude out of the EUF or into the EUF and, in fact, the two configurations may in some circumstances be understood as being equivalent, with the portion 452 between two depressed light diverting elements being considered to be a light diverting element that protrudes out from the EUF.

Figure 4D:
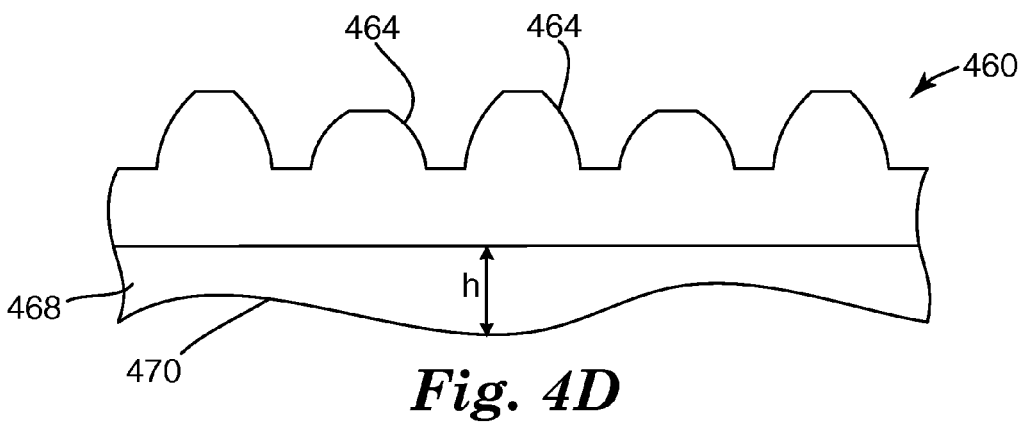

The light diverting elements need not all be of the same height. For example, as is schematically illustrated in FIG. 4D, the light diverting elements 464 may be of different heights. Also, a single light diverting element may have a height that varies along its length. For example, the light diverting element 470 on the second light diverting surface 468 has a height, h, that varies depending on the position along the film 460.

Figure 5:
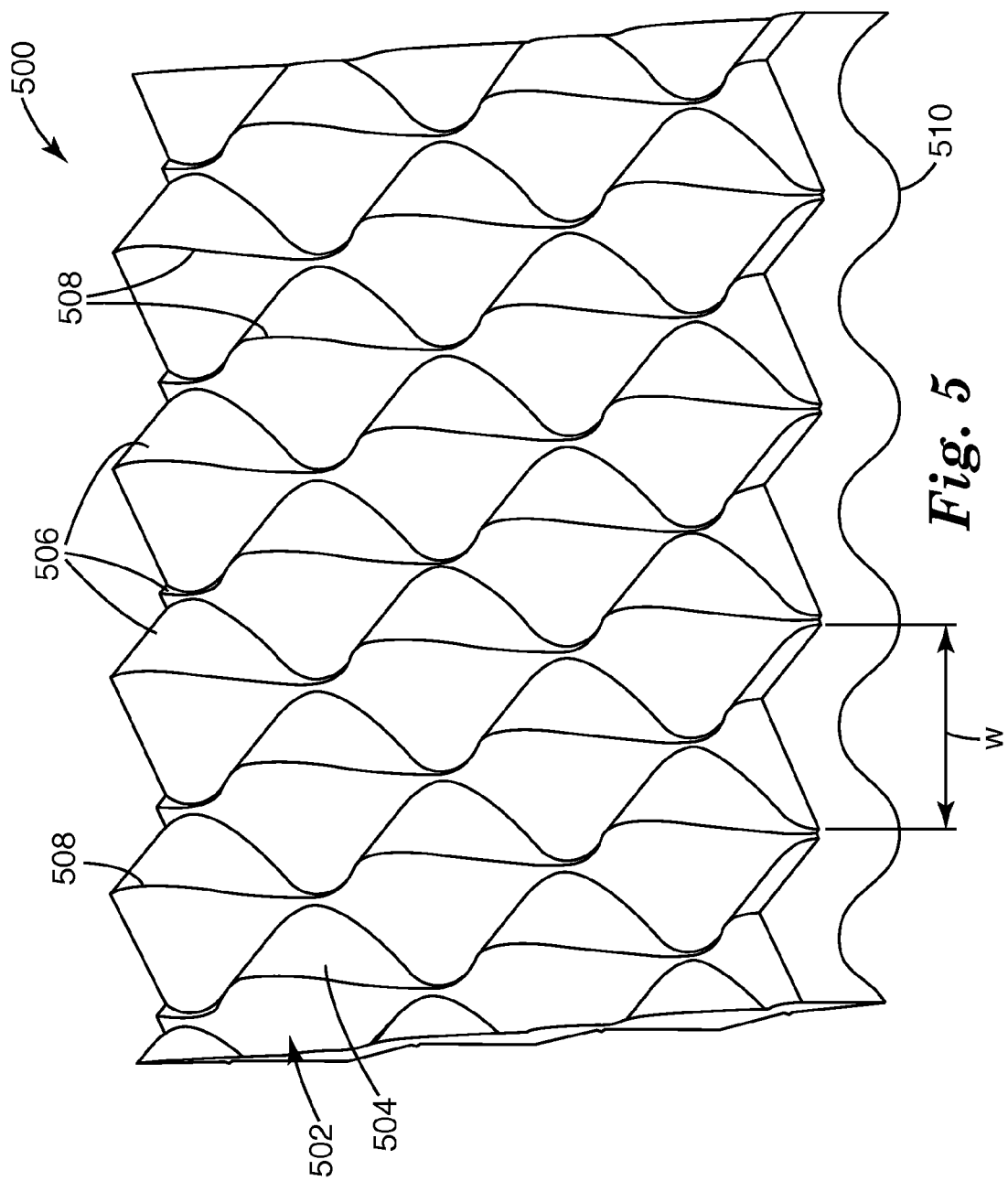

Another embodiment of a EUF whose light diverting elements vary in height is schematically illustrated in FIG. 5. The EUF 500 has a first light diverting surface 502 whose light diverting elements 504 are formed as prisms 506 having undulating ridges 508 The height of the ridges 508 varies along the prisms 506 and the width, w, also varies along the prisms 506. This type of surface is described in greater detail in U.S. patent application Ser. No. 11/467,230, incorporated herein by reference. The second light diverting surface 510 may contain light diverting elements of any desired shape. For example, the second light diverting surface 510 may include light diverting elements formed as prisms having undulating ridges.

Figure 6A:
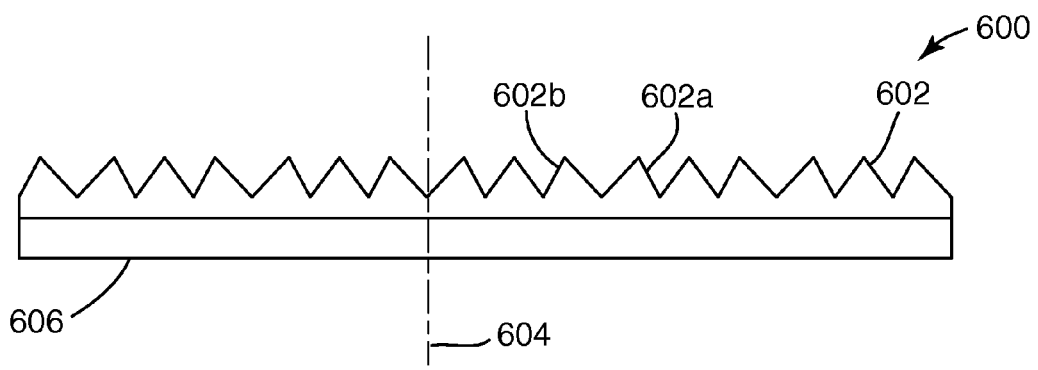

The light diverting elements need not be symmetrical relative to a normal to the EUF. One example of an EUF 600 having asymmetrical light diverting element 602 is schematically illustrated in FIG. 6A. In this particular embodiment, the light diverting elements 602 are formed as prisms having straight sides. At least some of the light diverting elements, for example light diverting elements 602a and 602b are asymmetrical relative to the axis 604 drawn normal to the EUF 600. The lower light diverting surface 606 may or may not include asymmetrical light diverting elements.

Figure 6B:
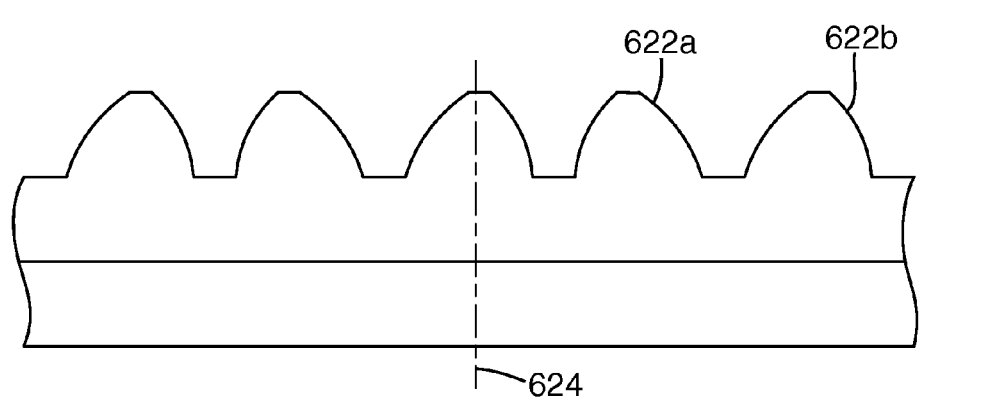

Another embodiment of an EUF 620 having asymmetrical light diverting elements 622 is schematically illustrated in FIG. 6B. At least some of the light diverting elements 622 have curved sides and are asymmetric relative to the axis 624 that is normal to the EUF 620, for example elements 622a and 622b.

Figure 6C:
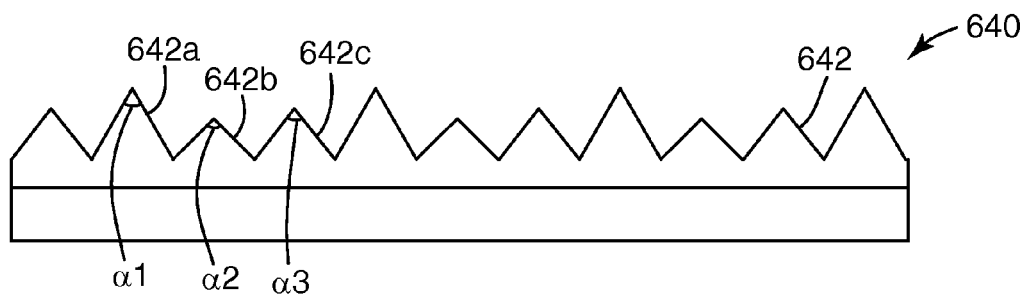

Another exemplary embodiment of EUF 640, schematically illustrated in FIG. 6C has light diverting elements 642 having a triangular cross-section, so that the light diverting elements 642 are formed with two straight sides 644. At least one of the light diverting elements 642 is formed with an apex angle that is different from the apex angle of the other light diverting elements. In the illustrated embodiment, light diverting element 642a has a first apex angle, α1, light diverting element 642b has a second apex angle, α2, and light diverting element 642c has a third apex angle, α3. Light diverting elements of the three different apex angles may be repeated in a regular manner across the EUF 640, or may be repeated in a random order across the EUF 640.

Figure 6D:
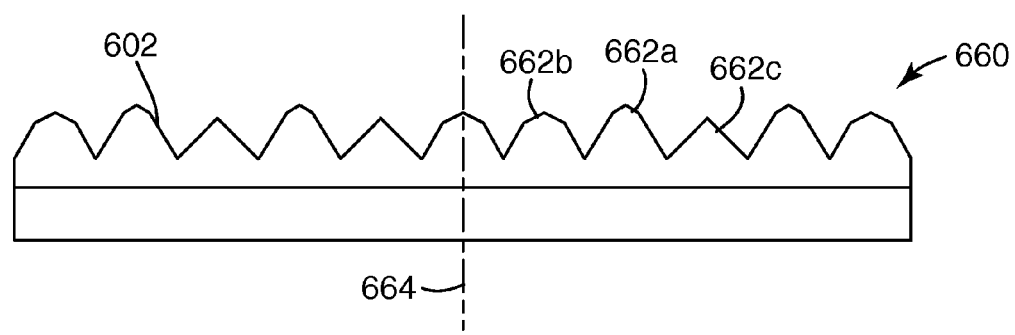

Another exemplary embodiment of EUF 660, schematically illustrated in FIG. 6D has light diverting elements 662 having different types of cross-sectional shapes. In this embodiment, light diverting elements 662a and 662b are each formed as faceted ribs with surfaces at different angles relative to the axis 664. Light diverting element 662c is formed as a triangular prismatic rib. Other shapes may also be used, for example light diverting elements with one or more curved surfaces may be used.

Figure 7A:
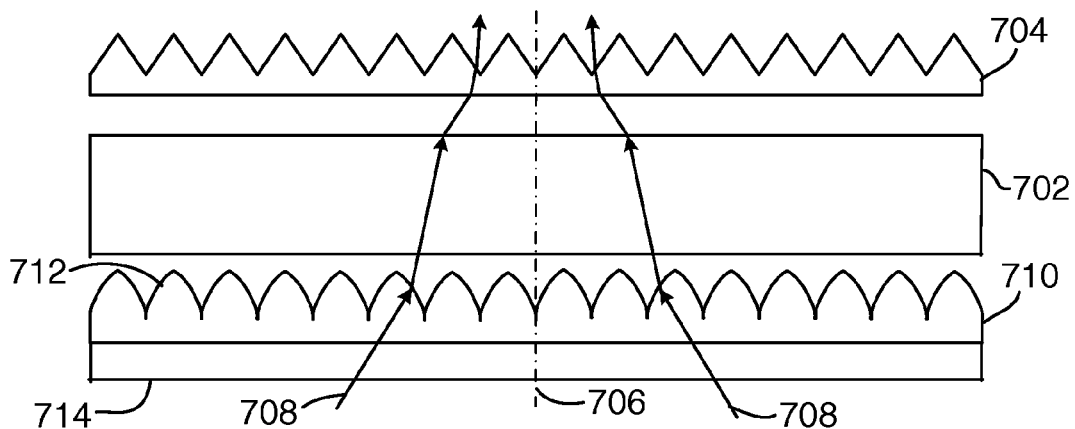
FIGS. 7A-7C schematically illustrated different embodiments of light management units that include an EUF according to principles of the present invention.

FIG. 7A schematically illustrates the use of an EUF with other light management layers 704. In the illustrated embodiment, the light management layer 704 comprises a prismatic brightness enhancing layer. In other embodiments, different types of layer, or additional light management layers, such as a reflective polarizer layer, may be positioned above the diffuser layer 702. The EUF 710 is positioned on the input side of the diffuser layer 702. The EUF 710 has a first light diverting surface 712 facing the diffuser layer 702 and a second light diverting surface 714 facing away from the diffuser layer 702. Light 708 from one or more light sources (not shown) passes through the EUF 710 to the diffuser layer 702 and on to the other light management layer or layers 704.

Figure 7B:
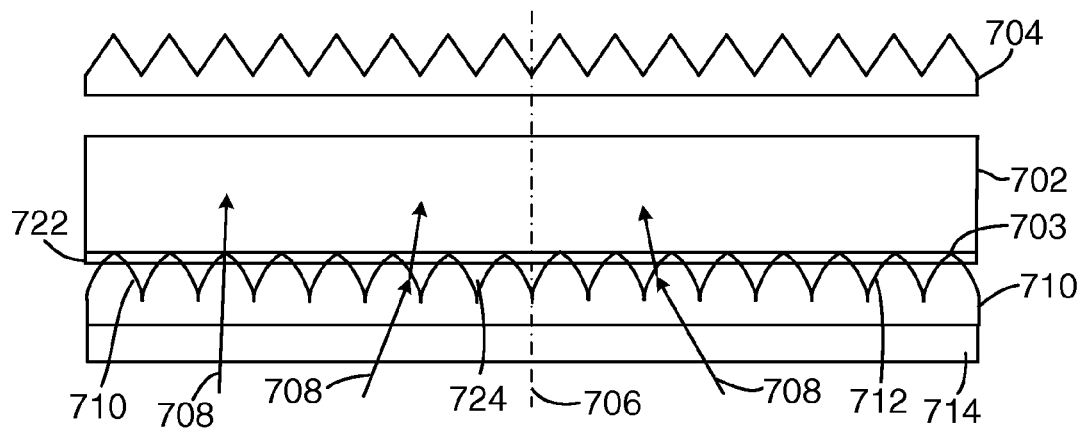

In some embodiments, the first light-diverting surface 712 may be attached to the diffuser layer 702, for example through the use of an adhesive. One exemplary embodiment of such an arrangement is schematically illustrated in FIG. 7B, in which parts of the first light diverting surface 712 penetrate into an adhesive layer 722 on the lower surface 703 of the diffuser layer 702. In some embodiments, a gap 724 remains between the adhesive layer 722 and parts of the surface 712. The attachment of structured film surfaces to other layers using adhesives is described in more detail in U.S. Pat. No. 6,846,089, incorporated by reference.

Figure 7C:
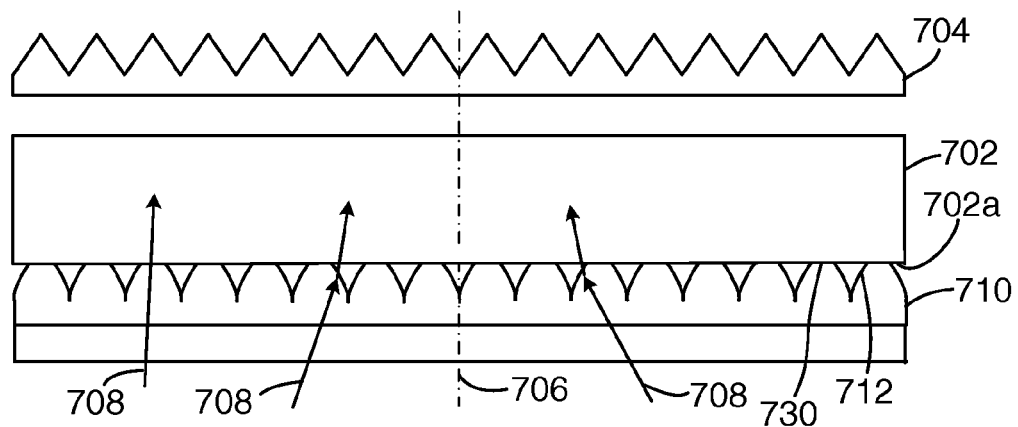

Another exemplary embodiment is schematically illustrated in FIG. 7C, in which the light-diverting surface 712 contains light diverting elements having portions 730 that are parallel to the lower surface 702a of the diffuser layer 702. The light diverting surface 712 surface may be pressed against the lower surface 702a of the diffuser layer 702, or may be adhered to the lower surface 702a, for example using an adhesive.

MODEL EXAMPLES

Figure 8:
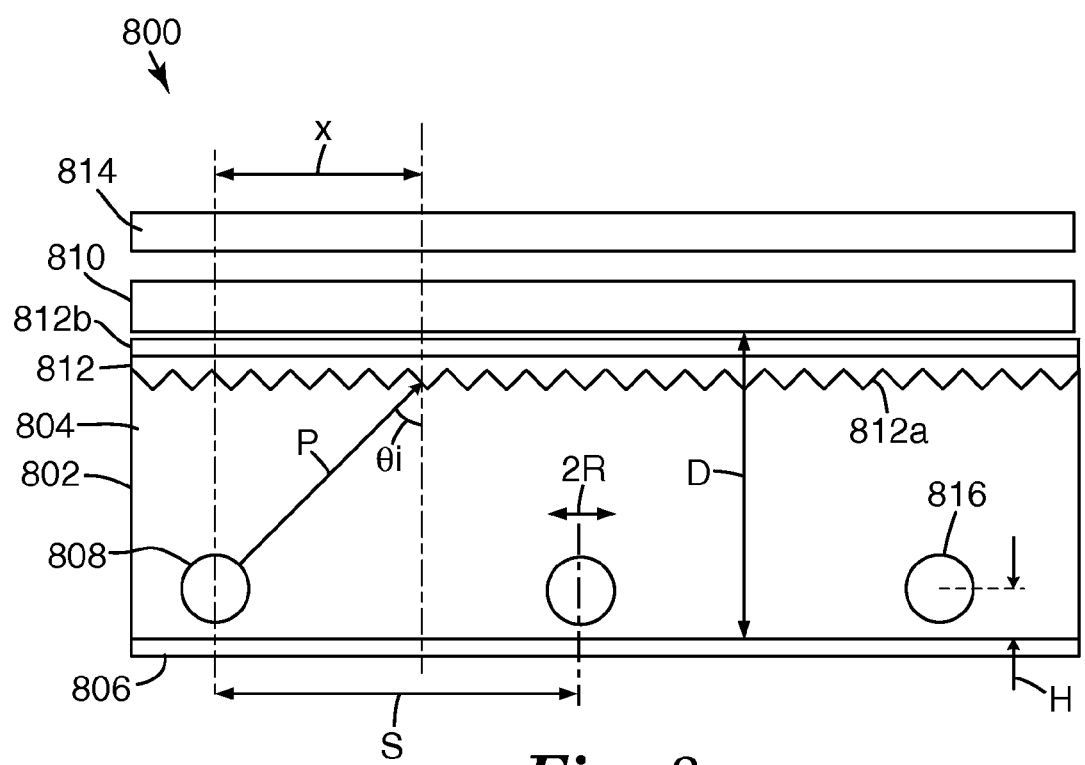
FIG. 8 schematically illustrates an embodiment of an illumination unit that includes light sources and light management films, according to principles of the present invention.

An optical ray trace model of a display's illumination unit, having a backlight and a light management unit, was constructed to investigate the optical performance of the illumination unit as a function of various parameters of an EUF. The model illumination unit 800, schematically illustrated in FIG. 8, comprised a reflective frame 802 that defines the edge limits of the light source array cavity 804, a back reflector 806 below the array of lamps 808, a diffuser layer 810 and an EUF 812. Unless otherwise indicated, the model assumed that the reflector 806 was a specular reflector. The model assumed that the lamps 808 each comprised a 38,000 nit elongated source, similar to a cold cathode fluorescent lamp. The lamps 808 were regularly spaced apart by a center-to-center distance S, the separation between the reflector 806 and the EUF 812 was given by D and the separation distance between the lamps 808 and the reflector 806 was H. The spacing between lamps 808, S, was assumed to be 30 mm, the diameter, 2R, of the lamps was assumed to be 3 mm and the value of D was assumed to be 13.3 mm. The diffuser layer 810 was 2 mm thick while the EUF 812 had a thickness of approximately 0.07 mm and was in contact with the lower surface of the diffuser layer 810. There were three bulbs 808 in the cavity. A reflective polarizer layer 814 was positioned above the diffuser layer 810.

The refractive index of the material used for the EUF was assumed to be 1.586, which corresponds to the value of the refractive index for an epoxy acrylate material, as might be used for the EUF. Other suitable types of materials for an EUF may be used. Example polymer materials include, but are not limited to, poly(carbonate) (PC); syndiotactic and isotactic poly(styrene) (PS); C1-C8 alkyl styrenes; alkyl, aromatic, and aliphatic ring-containing (meth)acrylates, including poly (methylmethacrylate) (PMMA) and PMMA copolymers; ethoxylated and propoxylated (meth)acrylates; multifunctional (meth)acrylates; acrylated epoxies; epoxies; and other ethylenically unsaturated materials; cyclic olefins and cyclic olefinic copolymers; acrylonitrile butadiene styrene (ABS); styrene acrylonitrile copolymers (SAN); epoxies; poly(vinylcyclohexane); PMMA/poly(vinylfluoride) blends; poly(phenylene oxide) alloys; styrenic block copolymers; polyimide;

polysulfone; poly(vinyl chloride); poly(dimethyl siloxane) (PDMS); polyurethanes; unsaturated polyesters; poly(ethylene), including low birefringence polyethylene; poly(propylene) (PP); poly(alkane terephthalates), such as poly(ethylene terephthalate) (PET); poly(alkane napthalates), such as poly (ethylene naphthalate)(PEN); polyamide; ionomers; vinyl acetate/polyethylene copolymers; cellulose acetate; cellulose acetate butyrate; fluoropolymers; poly(styrene)-poly(ethylene) copolymers; PET and PEN copolymers, including polyolefinic PET and PEN; and poly(carbonate)/aliphatic PET blends. The term (meth)acrylate is defined as being either the corresponding methacrylate or acrylate compounds.

The luminance above the reflective polarizer 814 was calculated for various shapes of light diverting surfaces on the EUF. In some calculations, the EUF contained only prismatic ribs having a triangular cross section, where the prismatic ribs in the EUF each had the same apex angle. For these cases, the luminance was calculated for ribs having the following different apex angles: 70°, 80°, 90°, 100°, 110°, 120° and 130°. The luminance is calculated for the light that propagates in a direction substantially normally from the reflective polarizer.

Figure 10:
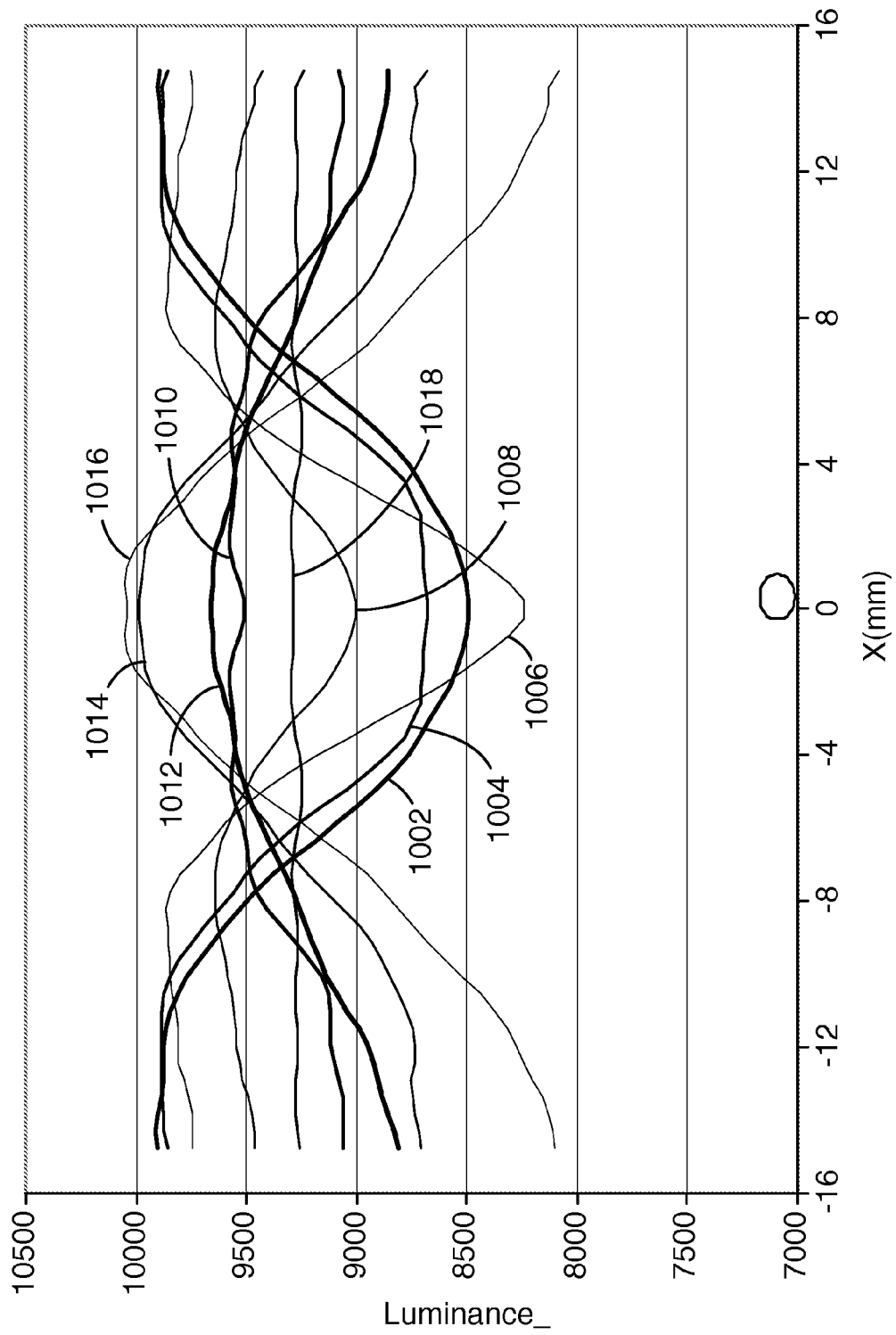
FIG. 10 shows a plot of the calculated brightness above an illumination unit plotted against position across the illumination unit for various model examples of EUF.

The luminance is shown plotted against position in FIG. 10 for the EUFs with apex angles of 70° (curve 1002), 80° (curve 1004), 90° (curve 1006), 100° (curve 1008), 110° (curve 1010), 120° (curve 1012) and 130° (curve 1014). Also plotted (curve 1016) is the luminance when the EUF is replaced by a flat, unstructured sheet. Only one lamp is shown, positioned at X=0 mm, however the behavior between neighboring lamps may be found by simply repeating the curves shown in FIG. 10.

In general, where the EUF has a large apex angle, or is replaced by a flat sheet, the luminance is high above the lamp and relatively low between the lamps. Where the apex angles are smaller, the luminance above the lamp is calculated to be lower, and higher between the lamps. This effect arises due to total internal reflection taking place within the prisms, which reduces the amount of light passing upwards from the lamps, and so a larger fraction of the light passes through the EUF by being incident on the EUF at an angle such that total internal reflection is less likely. None of the curves, however, is particularly flat.

Curve 1018 corresponds to a blended luminance, formed by adding 47% of the values of curve 1002, 52% of the values of curve 1014 and 1% of the values of curve 1016. This model is referred to as Blend 1. This qualitatively suggests that the use of light diverting elements having surfaces that slope at more than one angle to the EUF axis may be useful in improving the uniformity of the luminance. This was explored by modeling an EUF having a repeating pattern as described in the following four examples.

EXAMPLE

Unit Cell 1

Figure 9A:
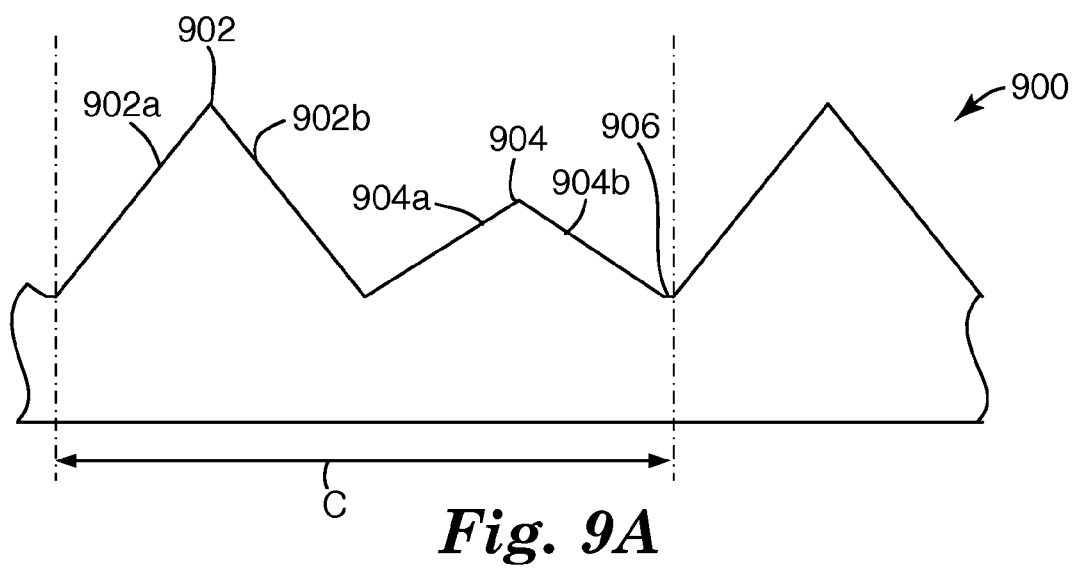
FIGS. 9A-9D show various parameters used in modeling a EUF according to principles of the present invention.

In other cases, the EUF included light diverting elements of different shapes. A unit cell of three differently shaped light diverting elements was repeated across the EUF. One type of unit cell, referred to as Unit Cell 1, is shown in the embodiment of EUF 900 illustrated in FIG. 9A. In this EUF 900 the unit cell, the surface between the two vertical dashed lines, included a first section 902, formed as a prismatic rib having sloped surfaces 902a and 902b, a second section 904 formed as a prismatic rib having sloped surfaces 904a and 904b, and a third section 906 that was essentially flat. If the width of the unit cell is taken as C, then the widths of the three sections are as shown in Table I below.

TABLE I

Characteristics of Unit Cell 1

| Section No. | Width | Apex Angle |
|---|---|---|
| 902 | 0.47 C | 70° |
| 904 | 0.52 C | 130° |
| 906 | 0.01 C | 178° |

EXAMPLE

Segmented 1

Figure 9B:
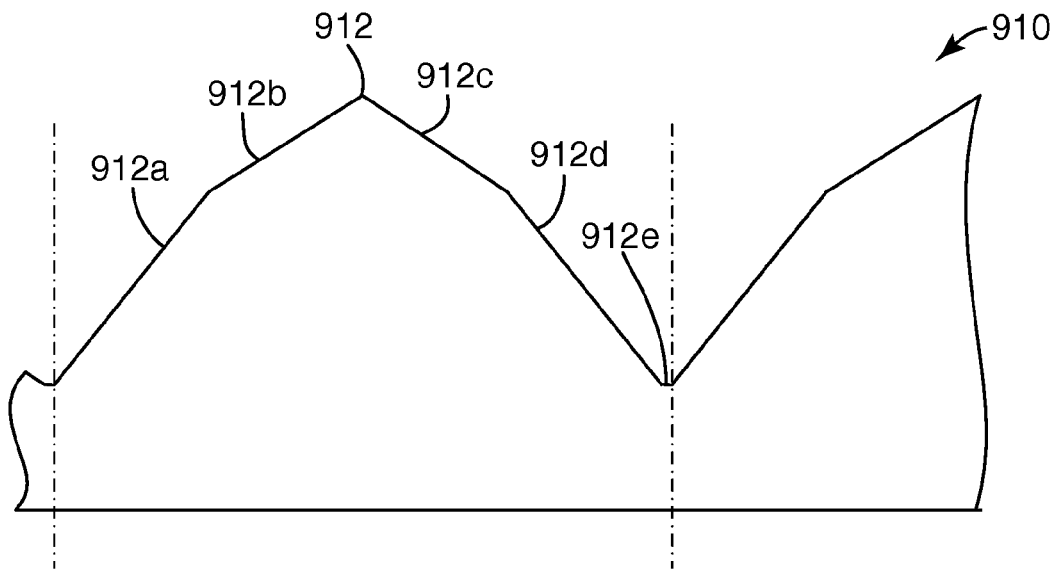

A segmented, or faceted, light diverting element 912 was modeled for an EUF 910 as schematically illustrated in FIG. 9B. The faceted element 912 had sections 912a, 912b, 912c, 912d and 912e. Sections 912a and 912d were facets that respectively had the same width and slope angle as sides 902a and 902a in the EUF 900. Sections 912b and 912c were facets having the same width and slope angle as sides 904a and 904b in the EUF 900. Section 912e was the same as section 906 in EUF 900.

EXAMPLE

Unit Cell 2

Figure 9C:
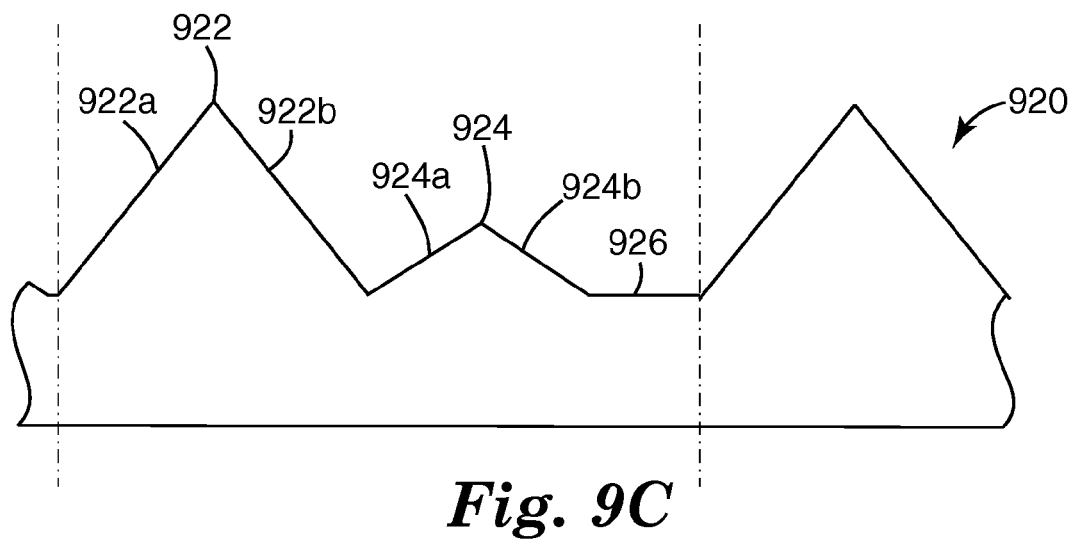

A second unit cell, referred to as Unit Cell 2, shown in FIG. 9C, was also used in come calculations. In this EUF 920 the unit cell included a first section 922, formed as a prismatic rib having sloped surfaces 922a and 922b, a second section 924 formed as a prismatic rib having sloped surfaces 924a and 924b, and a third section 926 that was essentially flat. The widths of the three sections are as shown in Table II below.

TABLE II

Characteristics of Unit Cell 2

| Section No. | Width | Apex Angle |
|---|---|---|
| 922 | 0.47 C | 80° |
| 924 | 0.4 C | 120° |
| 926 | 0.13 C | 178° |

EXAMPLE

Segmented 2

Figure 9D:
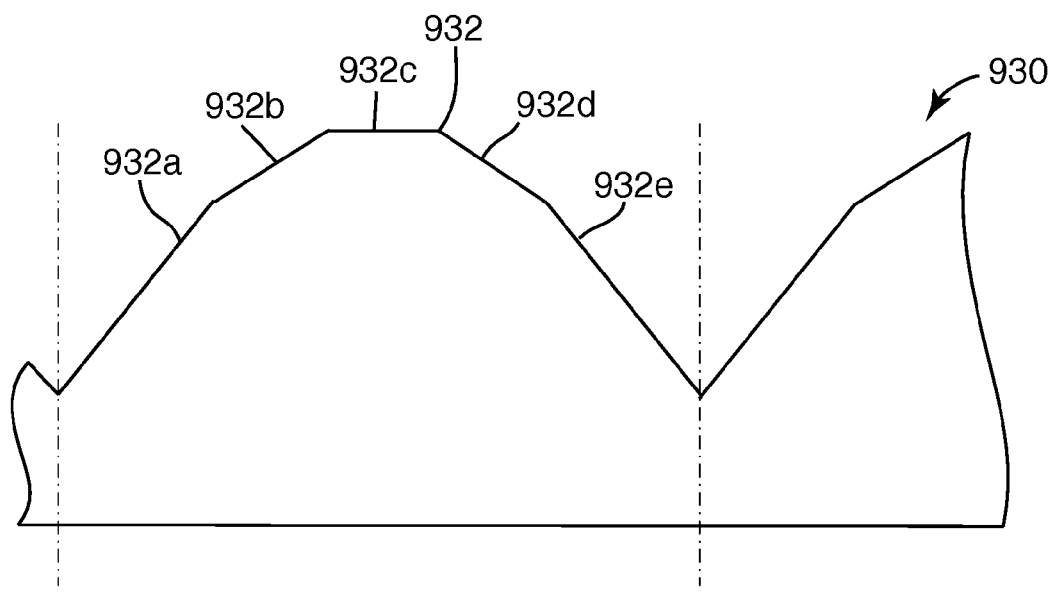

A segmented light diverting element 932 was modeled for an EUF 930 as schematically illustrated in FIG. 9D. The segmented element 932 had sections 932a, 932b, 932c, 932d and 932e. Sections 932a and 932d were facets that respectively had the same width and slope angle as sides 922a and 922a in the EUF 920. Sections 932b and 932c were facets having the same width and slope angle as sides 924a and 924b in the EUF 900. Section 932e was the same width as section 926 in EUF 920.

The flat section, section 3, was modeled as a prism having a triangular shape with an apex angle of 178°.

Figure 11:
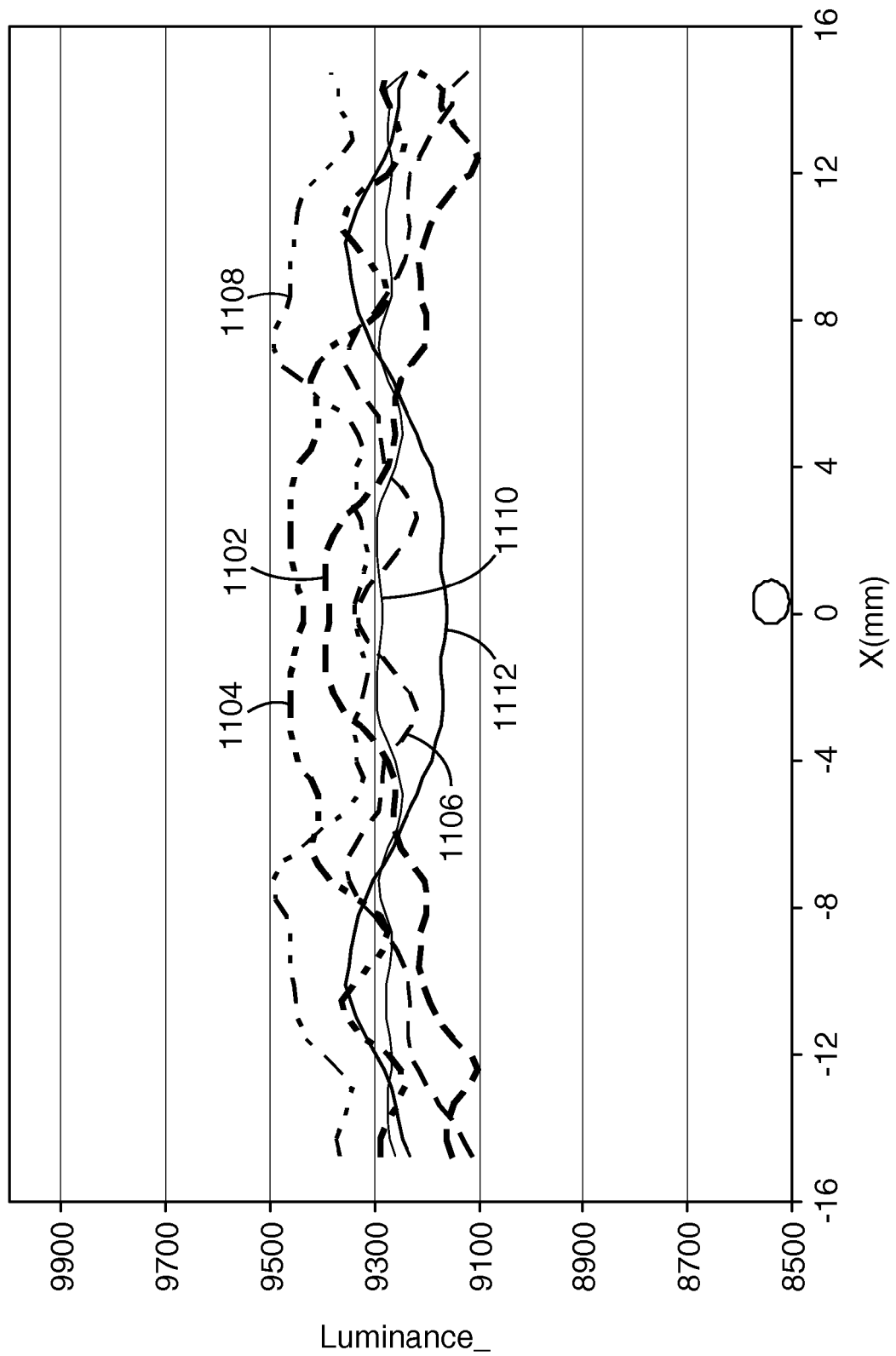
FIG. 11 shows a plot of the calculated brightness above an illumination unit as a function of position across the illumination unit for various examples of EUF having multi-angle refracting surfaces.

The luminance calculated for Unit Cell 1 (curve 1102), Segment 1 (curve 1104), Unit Cell 2 (curve 1106), and Segment 2 (curve 1108) is shown in FIG. 11. Also shown on this graph are two "blended" results, found by blending weighted values of three of the curves in FIG. 10. Curve 1110 is the same as the blend curve 1018 in FIG. 10, Blend 1. Curve 1112 is a blend calculated by adding 47% of the values of curve 1004, 40% of the values of curve 1012 and 13% of the values of curve 1016. This model is referred to as Blend 2. As can be seen, these curves are all relatively close in value.

Table III, below summarizes the average luminance and the uniformity for each of the curves shown in FIGS. 10 and 11. The uniformity was calculated as the standard deviation from the average luminance value, in per cent.

TABLE III

| EUF style | Luminance (nits) | Uniformity (% std. deviation) |
| --- | --- | --- |
| 70° prism | 9299 | 5.7% |
| 80° prism | 9384 | 5.2% |
| 90° prism | 9435 | 5.6% |
| 100° prism | 9459 | 2.1% |
| 110° prism | 9357 | 2.2% |
| 120° prism | 9284 | 3.0% |
| 130° prism | 9259 | 5.2% |
| Flat | 9014 | 7.6% |
| Unit Cell 1 | 9241 | 0.93% |
| Segment 1 | 9365 | 0.81% |
| Blend 1 | 9275 | 0.15% |
| Unit Cell 2 | 9256 | 0.64% |
| Segment 2 | 9389 | 0.64% |
| Blend 2 | 9256 | 0.7% |

Those models that include light diverting surfaces that lie at more than one angle to the film axis, i.e. the blends, unit cells and segmented cases, show a significantly enhanced uniformity over the single apex angle examples.

It is believed by the inventors that the improvement in luminance may be explained, at least in part, as follows. Consider the system 1200 schematically illustrated in FIG. 12A, in which light from a lamp 1202 is directed to an EUF 1204 that has a simple prismatic light diverting surface having one apex angle. Light 1206 that is normally incident on the EUF 1204 is totally internally reflected by the prismatic light diverting surface. This reduces the luminance of the light at a position direction above the lamp 1202. Light 1208 that is incident at the EUF at a certain angle, $\theta_n$, is diverted by the EUF 1204 in such a way as to propagate in a direction substantially perpendicular to the EUF 1204. Light 1210, 1212 that is incident at the EUF at other angles passes out of the EUF in directions other than the perpendicular direction. The diffuser spreads light around an incident ray direction and is least attenuating to light incident in the normal direction. Therefore, light diverted substantially in the normal direction will appear brighter to the normal observer than light diverted away from the normal. The value of $\theta_n$ is determined by the slope angle of the light diverting surface and the refractive index of the EUF material. One way of understanding the system 1200 is to consider the EUF 1204 as splitting light into two images that propagate perpendicularly to the EUF 1204, i.e. providing spatial separation, and the subsequent diffuser layer 1214 as providing angular separation.

Consider now the system 1250 schematically illustrated in FIG. 12B, in which light from a lamp 1252 is directed to an EUF 1254 that has light diverting elements 1256 having surfaces positioned at more than one angle to the axis 1258. In the illustrated embodiment, the light diverting elements 1256 are faceted elements, but other types of elements may be used, for example with curved surfaces. Accordingly, light ray 1259, which is normally incident on the EUF 1254 may be totally internally reflected by the light diverting elements 1256. Furthermore, light rays 1260a and 1260b, which pass out of the EUF 1254 in a direction perpendicular to the EUF 1254, are incident at the EUF at different angles, $\theta_{na}$ and $\theta_{nb}$ respectively. Consequently, perpendicular-directed light propagates out of a larger portion of the EUF 1254 than the EUF 1204. This helps to spread the light more uniformly between the lamps 1252, leading to a greater uniformity in the luminance. Thus, when the EUF includes light diverting surfaces oriented at more than one angle to the film axis, the splitting function performed by the EUF results in the split light being spread out more than when there is a single-angle light diverting surface. This splitting action, however, is better performed when the light diverting element has one or more discontinuities, i.e. relatively sharp changes in slope angle, than when there are no sharp changes in slope angle as might be found with a lens. A light diverting element having a continuous surface, such as a lens, has been found not to function as well as a light diverting element as, for example, a faceted structure or other structures described herein. In addition, a faceted surface may easier to manufacture than a continuous surface, such as a circular or elliptical surface.

Different approaches may be followed to optimizing the design of a light diverting surface. One approach useful in some cases, like that described above with respect to the examples, is to first model the performance of several simple shapes, for example the performance of simple EUFs having prismatic ribs of different apex angle, as shown in FIG. 10. Next, a blend of two, three, or more different curves to produce a blended curve that is relatively flat in luminance. The blend may be formed by adding weighted values of different curves. Once an acceptable blend has been produced, a starting point for optimization may be based on a unit cell or segmented surface that contains prisms or segments whose size is given by the weight of the related curve used to produce the blend. The performance of the unit cell or segmented surface may be different from that of the blend due to interactions between facets. Optimization may then proceed by varying different parameters of the unit cell or segmented surface to observe trends in the EUF performance.

It should be understood that light-diverting surfaces may take on many different types of shapes that are not discussed here in detail, including surfaces with light-diverting elements that are random in position, shape, and/or size. In addition, while the exemplary embodiments discussed above are directed to light-diverting surfaces that refractively divert the illumination light, other embodiments may diffract the illumination light, or may divert the illumination light through a combination of refraction and diffraction. The computational results described here show that different types and shapes of light-deviating layer provide the potential to increase luminance, and reduce the variation in the luminance, compared with a simple diffuser alone. Light diverting elements may include different numbers of facets compared to those illustrated in the examples provided above, and the light diverting members may be arranged in a repeating pattern or in a pattern that does not repeat. In addition, one or more facets of an EUF may be curved or flat. In the case of curved facets, there surface of a light diverting element may still contain a sharp change in surface slope, for example at the peak of the light diverting element.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A directly illuminated display unit, comprising:
   a display panel;
   one or more light sources disposed behind the display panel and capable of producing illumination light;
   a diffuser disposed between the one or more light sources and the display panel; and
   a light diverting layer disposed between the one or more light sources and the diffuser, the light diverting layer comprising light diverting members disposed on a first face of the light diverting layer facing the diffuser, at least one of the light diverting members having a surface with at least one sharp change in slope and having a first side and a second side, the first and second sides of the light diverting members each comprising at least one of a plurality of facets and a curved surface, the first side having a first best fit center of curvature and the second side having a second best fit center of curvature, the positions of the first and second best fit centers of curvature being different.

2. A unit as recited in claim 1, wherein the diffuser is a diffusing surface.

3. A unit as recited in claim 1, wherein the diffuser is a diffuser layer.

4. A unit as recited in claim 3, wherein the diffuser layer is attached to the light diverting layer.

5. A unit as recited in claim 1, further comprising an adhesive layer on a side of the diffuser facing the light diverting layer, portions of the light diverting members penetrating into the adhesive layer.

6. A unit as recited in claim 1, wherein at least some portions of the light diverting members are parallel to the diffuser and are attached to the diffuser.

7. A unit as recited in claim 1, wherein at least one of the light diverting members is asymmetrical relative to an axis normal to the light diverting layer.

8. A unit as recited in claim 1, wherein at least one side of the light diverting layer comprises at least one flat surface portion between two neighboring light diverting members.

9. A unit as recited in claim 1, wherein at least one of the light diverting members is formed as an elongated member extending across the light diverting layer.

10. A unit as recited in claim 9, wherein the elongated member has a height that is constant along the length of the elongated member.

11. A unit as recited in claim 9, wherein the elongated member has a height that varies along the length of the elongated member.

12. A unit as recited in claim 9, wherein the elongated member has a width that varies along the length of the elongated member.

13. A unit as recited in claim 1, wherein two of the light diverting members on the first side of the light diverting layer have heights that are different.

14. A unit as recited in claim 1, further comprising one or more light management films disposed between the diffuser and the display panel.

15. A unit as recited in claim 14, wherein the one or more light management films comprise at least a first brightness enhancing film and a reflective polarizer film.

16. A unit as recited in claim 1, wherein the display panel comprises a liquid crystal display (LCD) panel.

17. A unit as recited in claim 1, wherein the one or more light sources comprise at least one light emitting diode.

18. A unit as recited in claim 1, wherein the one or more light sources comprise at least one fluorescent lamp.

19. A unit as recited in claim 1, further comprising a control unit coupled to the display panel to control an image displayed by the unit.

20. A unit as recited in claim 1, further comprising second light diverting members positioned on a second side of the light diverting layer facing away from the first side of the light diverting layer.

21. A unit as recited in claim 1, wherein the light diverting members comprise curved surface portions.

22. A unit as recited in claim 1, wherein the light diverting members comprise faceted surface portions.

23. A unit as recited in claim 1, wherein a first of the light diverting members has a first apex angle and a second of the light diverting members has a second apex angle different from the first apex angle.

24. A unit as recited in claim 1, wherein the light diverting members comprise surfaces disposed at more than one angle relative to a normal to the light diverting layer, at least some of the light non-normally incident on the light diverting layer from a first of the one or more light sources emerges from the light diverting members in a substantially normal direction, a lateral extent of the normally emerging light being greater than where the surfaces are disposed at a single angle relative to the normal to the light diverting layer.

* * * * *